United States Patent
Bittar

(10) Patent No.: US 9,465,132 B2
(45) Date of Patent: *Oct. 11, 2016

(54) TOOL FOR AZIMUTHAL RESISTIVITY MEASUREMENT AND BED BOUNDARY DETECTION

(75) Inventor: Michael S. Bittar, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 12/689,435

(22) Filed: Jan. 19, 2010

(65) Prior Publication Data

US 2010/0117655 A1    May 13, 2010

Related U.S. Application Data

(60) Division of application No. 11/835,619, filed on Aug. 8, 2007, now Pat. No. 7,659,722, and a continuation-in-part of application No. 11/457,709, filed on Jul. 14, 2006, now Pat. No. 7,265,552, which (Continued)

(51) Int. Cl.
*G01V 3/08* (2006.01)
*G01V 3/10* (2006.01)
(Continued)

(52) U.S. Cl.
CPC . *G01V 3/28* (2013.01); *G01V 3/02* (2013.01); *G01V 3/30* (2013.01); *G01V 3/12* (2013.01)

(58) Field of Classification Search
CPC .......... G01V 3/12; G01V 3/083; G01V 3/30; G01V 3/28; G01V 3/02
USPC ....... 324/332, 333, 334, 335, 336, 337, 338, 324/339, 340, 341, 342, 343; 702/7; 175/50
See application file for complete search history.

(56) References Cited

U.S. PATENT DOCUMENTS 2,901,689 A  8/1959  Barrett
3,014,177 A  12/1961  Hungerford et al.
(Continued)

FOREIGN PATENT DOCUMENTS

AU  2008365630  5/2012
CA  2415563  1/2002
(Continued)

OTHER PUBLICATIONS

"Canadian Office Action", dated Jan. 23, 2009, Application No. 2,415,563, "Electromagnetic Wave Resistivity Tool With a Tilted Antenna", filed Jan. 10, 2001, 3 pgs.

(Continued)

*Primary Examiner* — Reena Aurora
(74) *Attorney, Agent, or Firm* — Krueger Iselin LLP; Benjamin Fite

(57) ABSTRACT

Systems and methods for performing bed boundary detection and azimuthal resistivity logging with a single tool are disclosed. Some method embodiments include logging a borehole with an azimuthally-sensitive resistivity logging tool; deriving both a resistivity log and a boundary detection signal from measurements provided by said tool; and displaying at least one of the boundary detection signal and the resistivity log. The resistivity log measurements may be compensated logs, i.e., logs derived from measurements by one or more symmetric transmitter-receiver arrangements. Though symmetric arrangements can also serve as the basis for the boundary detection signal, a greater depth of investigation can be obtained with an asymmetric arrangement. Hence the boundary detection signal may be uncompensated.

8 Claims, 5 Drawing Sheets

Related U.S. Application Data is a continuation of application No. 11/198,066, filed on Aug. 5, 2005, now Pat. No. 7,138,803, which is a continuation of application No. 10/616,429, filed on Jul. 9, 2003, now Pat. No. 7,019,528, which is a continuation of application No. 10/255,048, filed on Sep. 25, 2002, now Pat. No. 6,911,824, which is a continuation of application No. 09/615,501, filed on Jul. 13, 2000, now Pat. No. 6,476,609, which is a continuation-in-part of application No. 09/238,832, filed on Jan. 28, 1999, now Pat. No. 6,163,155.

(60) Provisional application No. 60/821,721, filed on Aug. 8, 2006, provisional application No. 60/821,988, filed on Aug. 10, 2006.

(51) Int. Cl.

| | | |
|---|---|---|
| G01V 3/28 | (2006.01) | |
| G01V 3/30 | (2006.01) | |
| G01V 3/02 | (2006.01) | |
| G01V 3/12 | (2006.01) | |

(56) References Cited

U.S. PATENT DOCUMENTS

| | | |
|---|---|---|
| 3,187,252 A | 6/1965 | Hungerford |
| 3,286,163 A | 11/1966 | Holser et al. |
| 3,305,771 A | 2/1967 | Arps |
| 3,408,561 A | 10/1968 | Redwine et al. |
| 3,412,815 A | 11/1968 | Holser |
| 3,510,757 A | 5/1970 | Huston |
| 3,539,911 A | 11/1970 | Youmans et al. |
| 3,561,007 A | 2/1971 | Gouilloud et al. |
| 3,808,520 A | 4/1974 | Runge |
| 3,982,176 A | 9/1976 | Meador |
| 4,209,747 A | 6/1980 | Huchital |
| 4,302,722 A | 11/1981 | Gianzero |
| 4,319,191 A | 3/1982 | Meador et al. |
| 4,360,777 A | 11/1982 | Segesman |
| 4,536,714 A | 8/1985 | Clark |
| 4,553,097 A | 11/1985 | Clark |
| 4,610,313 A | 9/1986 | Daly et al. |
| 4,611,173 A | 9/1986 | Bravenec et al. |
| 4,636,731 A | 1/1987 | Savage et al. |
| 4,651,101 A | 3/1987 | Barber et al. |
| 4,697,190 A | 9/1987 | Oswald |
| 4,700,142 A | 10/1987 | Kuckes |
| 4,716,973 A | 1/1988 | Cobern |
| 4,780,857 A | 10/1988 | Lyle et al. |
| 4,785,247 A | 11/1988 | Meador et al. |
| 4,791,373 A | 12/1988 | Kuckes |
| 4,808,929 A | 2/1989 | Oldigs |
| 4,810,970 A | 3/1989 | Warren et al. |
| RE32,913 E | 4/1989 | Clark |
| 4,845,433 A | 7/1989 | Kleinberg |
| 4,849,699 A * | 7/1989 | Gill et al. ................... 324/339 |
| 4,873,488 A | 10/1989 | Barber et al. |
| 4,876,511 A | 10/1989 | Clark |
| 4,899,112 A | 2/1990 | Clark |
| 4,933,640 A | 6/1990 | Kuckes |
| 4,940,943 A | 7/1990 | Bartel et al. |
| 4,945,987 A | 8/1990 | Wittrisch |
| 4,949,045 A | 8/1990 | Clark et al. |
| 4,962,490 A | 10/1990 | Lyle et al. |
| 4,968,940 A | 11/1990 | Clark et al. |
| 4,980,643 A | 12/1990 | Gianzero et al. |
| 5,089,779 A | 2/1992 | Rorden |
| 5,115,198 A | 5/1992 | Gianzero et al. |
| 5,160,925 A | 11/1992 | Dailey et al. |
| 5,200,705 A | 4/1993 | Clark et al. |
| 5,210,495 A | 5/1993 | Hapashey et al. |
| 5,230,386 A | 7/1993 | Wu et al. |
| 5,239,448 A | 8/1993 | Perkins et al. |
| 5,241,273 A | 8/1993 | Luling |
| 5,243,290 A | 9/1993 | Safinya |
| 5,260,662 A | 11/1993 | Rorden |
| 5,278,507 A | 1/1994 | Bartel et al. |
| 5,329,448 A | 7/1994 | Rosthal |
| 5,332,048 A | 7/1994 | Underwood et al. |
| 5,355,088 A | 10/1994 | Howard, Jr. |
| 5,389,881 A | 2/1995 | Bittar et al. |
| 5,402,068 A | 3/1995 | Meador et al. |
| 5,428,293 A | 6/1995 | Sinclair et al. |
| 5,442,294 A | 8/1995 | Rorden |
| 5,448,227 A | 9/1995 | Orban et al. |
| 5,475,309 A | 12/1995 | Hong et al. |
| 5,485,089 A | 1/1996 | Kuckes |
| 5,501,285 A | 3/1996 | Lamine et al. |
| 5,508,616 A | 4/1996 | Sato et al. |
| 5,530,358 A | 6/1996 | Wisler et al. |
| 5,550,473 A | 8/1996 | Klein |
| 5,563,512 A | 10/1996 | Mumby |
| 5,585,790 A | 12/1996 | Luling |
| 5,589,775 A | 12/1996 | Kuckes |
| 5,594,343 A | 1/1997 | Clark et al. |
| 5,602,541 A | 2/1997 | Comeau et al. |
| 5,656,930 A | 8/1997 | Hagiwara |
| 5,720,355 A | 2/1998 | Lamine et al. |
| 5,725,059 A | 3/1998 | Kuckes et al. |
| 5,757,191 A | 5/1998 | Gianzero |
| 5,781,436 A | 7/1998 | Forgang et al. |
| 5,813,480 A | 9/1998 | Zaleski, Jr. et al. |
| 5,854,991 A | 12/1998 | Gupta et al. |
| 5,864,058 A | 1/1999 | Chen-Kang |
| 5,869,968 A | 2/1999 | Brooks et al. |
| 5,886,526 A | 3/1999 | Wu |
| 5,892,460 A | 4/1999 | Jerabek et al. |
| 5,923,170 A | 7/1999 | Kuckes |
| 5,999,883 A | 12/1999 | Gupta et al. |
| 6,044,325 A | 3/2000 | Chakravarthy et al. |
| 6,057,784 A | 5/2000 | Schaaf et al. |
| 6,084,826 A | 7/2000 | Leggett, III |
| 6,147,496 A | 11/2000 | Strack et al. |
| 6,150,822 A | 11/2000 | Hong et al. |
| 6,158,532 A | 12/2000 | Logan et al. |
| 6,163,155 A | 12/2000 | Bittar |
| 6,181,138 B1 | 1/2001 | Hagiwara et al. |
| 6,188,222 B1 | 2/2001 | Seydoux et al. |
| 6,191,586 B1 | 2/2001 | Bittar |
| 6,206,108 B1 | 3/2001 | MacDonald et al. |
| 6,218,841 B1 | 4/2001 | Wu |
| 6,218,842 B1 | 4/2001 | Bittar |
| 6,230,822 B1 | 5/2001 | Sullivan et al. |
| 6,297,639 B1 | 10/2001 | Clark et al. |
| 6,304,086 B1 | 10/2001 | Minerbo et al. |
| 6,351,127 B1 | 2/2002 | Rosthal et al. |
| 6,353,321 B1 | 3/2002 | Bittar |
| 6,359,438 B1 | 3/2002 | Bittar |
| 6,373,254 B1 | 4/2002 | Dion et al. |
| 6,466,020 B2 | 10/2002 | Kuckes et al. |
| 6,476,609 B1 | 11/2002 | Bittar |
| 6,538,447 B2 | 3/2003 | Bittar |
| 6,540,033 B1 | 4/2003 | Sullivan et al. |
| 6,541,979 B2 | 4/2003 | Omeragic |
| 6,543,312 B2 | 4/2003 | Sullivan et al. |
| 6,556,014 B1 | 4/2003 | Kong et al. |
| 6,566,881 B2 | 5/2003 | Omeragic et al. |
| 6,571,886 B1 | 6/2003 | Sullivan et al. |
| 6,573,722 B2 | 6/2003 | Rosthal et al. |
| 6,584,408 B2 | 6/2003 | Omeragic |
| 6,614,229 B1 | 9/2003 | Clark et al. |
| 6,626,251 B1 | 9/2003 | Sullivan et al. |
| 6,648,082 B2 | 11/2003 | Schultz et al. |
| 6,691,802 B2 | 2/2004 | Schultz et al. |
| 6,693,430 B2 | 2/2004 | Rosthal et al. |
| 6,698,536 B2 | 3/2004 | Moran et al. |
| 6,710,600 B1 | 3/2004 | Kopecki et al. |
| 6,727,706 B2 | 4/2004 | Gao et al. |
| 6,736,222 B2 | 5/2004 | Kuckes et al. |
| 6,777,940 B2 | 8/2004 | Macune |
| 6,778,127 B2 | 8/2004 | Stolarczyik et al. |
| 6,810,331 B2 | 10/2004 | Bittar et al. |

(56) References Cited

U.S. PATENT DOCUMENTS

| | | |
|---|---|---|
| 6,814,162 B2 | 11/2004 | Moran et al. |
| 6,850,068 B2 | 2/2005 | Chemali et al. |
| 6,863,127 B2 | 3/2005 | Clark et al. |
| 6,885,943 B2 | 4/2005 | Bittar et al. |
| 6,900,640 B2 | 5/2005 | Fanini et al. |
| 6,911,824 B2 | 6/2005 | Bittar |
| 6,944,546 B2 | 9/2005 | Xiao et al. |
| 6,998,844 B2 | 2/2006 | Omeragic et al. |
| 7,017,662 B2 | 3/2006 | Schultz et al. |
| 7,019,528 B2 | 3/2006 | Bittar |
| 7,038,455 B2 | 5/2006 | Beste et al. |
| 7,046,010 B2 | 5/2006 | Hu et al. |
| 7,066,280 B2 | 6/2006 | Sullivan et al. |
| 7,091,877 B2 | 8/2006 | Barber et al. |
| 7,098,664 B2 | 8/2006 | Bittar et al. |
| 7,098,858 B2 | 8/2006 | Bittar et al. |
| 7,138,803 B2 | 11/2006 | Bittar |
| 7,207,215 B2 | 4/2007 | Spross et al. |
| 7,227,363 B2 | 6/2007 | Gianzero et al. |
| 7,265,552 B2 | 9/2007 | Bittar |
| 7,296,462 B2 | 11/2007 | Gregory et al. |
| 7,316,277 B2 | 1/2008 | Jeffryes |
| 7,345,487 B2 | 3/2008 | Bittar et al. |
| 7,350,568 B2 | 4/2008 | Mandal et al. |
| 7,394,257 B2 | 7/2008 | Martinez et al. |
| 7,427,863 B2 | 9/2008 | Bittar |
| 7,536,261 B2 | 5/2009 | Omeragic et al. |
| 7,557,579 B2 | 7/2009 | Bittar |
| 7,557,580 B2 | 7/2009 | Bittar |
| 7,557,582 B2 | 7/2009 | Moore |
| 7,612,565 B2 | 11/2009 | Seydoux et al. |
| 7,657,377 B2 | 2/2010 | Sinclair et al. |
| 7,659,722 B2 | 2/2010 | Bittar |
| 7,746,078 B2 | 6/2010 | Bittar et al. |
| 7,775,276 B2 | 8/2010 | Pelletier et al. |
| 7,786,731 B2 | 8/2010 | Cole et al. |
| 7,825,664 B2 | 11/2010 | Homan et al. |
| 7,839,148 B2 | 11/2010 | Vehra et al. |
| 7,839,346 B2 | 11/2010 | Bittar et al. |
| 7,924,013 B2 | 4/2011 | Seydoux et al. |
| 8,016,053 B2 | 9/2011 | Menezes et al. |
| 8,030,937 B2 | 10/2011 | Hu et al. |
| 8,085,049 B2 | 12/2011 | Bittar et al. |
| 8,085,050 B2 | 12/2011 | Bittar et al. |
| 8,222,902 B2 | 7/2012 | Bittar et al. |
| 8,264,228 B2 | 9/2012 | Bittar et al. |
| 8,274,289 B2 | 9/2012 | Bittar et al. |
| 8,433,518 B2 | 4/2013 | Omeragic et al. |
| 8,593,147 B2 | 11/2013 | Bittar |
| 8,736,270 B2 | 5/2014 | Seydoux et al. |
| 2003/0018433 A1 | 1/2003 | Blanch et al. |
| 2003/0051914 A1 | 3/2003 | Bittar |
| 2003/0055565 A1 | 3/2003 | Omeragic |
| 2003/0062197 A1 | 4/2003 | Moran et al. |
| 2003/0076107 A1 | 4/2003 | Fanini et al. |
| 2003/0184302 A1 | 10/2003 | Omeragic et al. |
| 2004/0027131 A1 | 2/2004 | Bittar |
| 2004/0059513 A1 | 3/2004 | Bittar et al. |
| 2004/0090234 A1 | 5/2004 | Macune |
| 2004/0140809 A1 | 7/2004 | Mercer |
| 2004/0145503 A1 | 7/2004 | Blanch et al. |
| 2004/0183538 A1 | 9/2004 | Hanstein et al. |
| 2004/0196047 A1 | 10/2004 | Fanini et al. |
| 2005/0006090 A1 | 1/2005 | Chemali et al. |
| 2005/0024060 A1 | 2/2005 | Bittar |
| 2005/0083063 A1 | 4/2005 | Omeragic et al. |
| 2005/0099184 A1 | 5/2005 | Gianzero et al. |
| 2005/0134280 A1 | 6/2005 | Bittar et al. |
| 2005/0140373 A1 | 6/2005 | Li et al. |
| 2005/0218898 A1 | 10/2005 | Fredette et al. |
| 2005/0251342 A1 | 11/2005 | Market et al. |
| 2006/0011385 A1 | 1/2006 | Seydoux et al. |
| 2006/0015256 A1 | 1/2006 | Hassan et al. |
| 2006/0022887 A1 | 2/2006 | Bittar |
| 2006/0038571 A1 | 2/2006 | Ostermeier et al. |
| 2006/0102353 A1 | 5/2006 | Storm et al. |
| 2006/0125479 A1 | 6/2006 | Chemali et al. |
| 2007/0075455 A1 | 7/2006 | Bittar |
| 2006/0244455 A1 | 11/2006 | Bittar |
| 2006/0255811 A1 | 11/2006 | Bittar et al. |
| 2006/0272859 A1 | 12/2006 | Pastusek et al. |
| 2007/0079989 A1 | 4/2007 | Bankston et al. |
| 2007/0186639 A1 | 8/2007 | Spross et al. |
| 2007/0205021 A1 | 9/2007 | Pelletier et al. |
| 2007/0229082 A1 | 10/2007 | Vehra et al. |
| 2007/0235225 A1 | 10/2007 | Bittar |
| 2007/0272442 A1 | 11/2007 | Pastusek et al. |
| 2007/0278008 A1 | 12/2007 | Kuckes et al. |
| 2008/0018895 A1 | 1/2008 | Opsal |
| 2008/0078580 A1 | 4/2008 | Bittar |
| 2008/0136419 A1 | 6/2008 | Seydoux et al. |
| 2008/0143336 A1 | 6/2008 | Legendre et al. |
| 2008/0173481 A1 | 7/2008 | Menezes et al. |
| 2008/0252296 A1 | 10/2008 | Hu et al. |
| 2008/0297161 A1 | 12/2008 | Gorek |
| 2008/0315884 A1 | 12/2008 | Bittar et al. |
| 2009/0015260 A1 | 1/2009 | Bittar |
| 2009/0045973 A1 | 2/2009 | Rodney et al. |
| 2009/0224764 A1 | 9/2009 | Bittar |
| 2009/0230968 A1 | 9/2009 | Bittar et al. |
| 2009/0278543 A1 | 11/2009 | Beste et al. |
| 2009/0302851 A1 | 12/2009 | Bittar et al. |
| 2009/0309798 A1 | 12/2009 | Bittar et al. |
| 2010/0127708 A1 | 5/2010 | Bittar |
| 2011/0019501 A1 | 1/2011 | Market |
| 2011/0133740 A1 | 6/2011 | Seydoux et al. |
| 2011/0180327 A1 | 7/2011 | Bittar et al. |
| 2011/0221443 A1 | 9/2011 | Bittar et al. |
| 2011/0251794 A1 | 10/2011 | Bittar et al. |
| 2011/0309835 A1 | 12/2011 | Barber et al. |
| 2012/0249149 A1 | 10/2012 | Bittar et al. |

FOREIGN PATENT DOCUMENTS

| | | |
|---|---|---|
| EP | 527089 | 2/1993 |
| EP | 0654687 | 5/1995 |
| EP | 0814349 | 12/1997 |
| EP | 9800733 | 1/1998 |
| EP | 0840142 | 5/1998 |
| EP | 093519 | 7/1999 |
| EP | 0155748 | 8/2001 |
| FR | 2 699 286 | 12/1992 |
| GB | 2 279 149 | 12/1994 |
| GB | 2279149 | 12/1994 |
| GB | 2472155 | 1/2011 |
| RU | 2279697 | 10/2003 |
| RU | 2305300 | 8/2007 |
| WO | WO9531736 | 11/1995 |
| WO | WO-0041006 | 7/2000 |
| WO | WO-0050926 | 8/2000 |
| WO | 02/04986 | 1/2002 |
| WO | WO-03069120 | 8/2003 |
| WO | WO-2007/149146 | 12/2007 |
| WO | WO-2006030489 | 12/2007 |
| WO | WO-2008021868 | 2/2008 |
| WO | WO-2009029517 | 3/2009 |
| WO | WO2009/073008 | 6/2009 |

OTHER PUBLICATIONS

"Canadian Office Action", dated Jan. 29, 2007, Application No. 2,415,563, "Electromagnetic Wave Resistivity Tool With a Tilted Antenna", filed Jul. 10, 2001, 4 pgs.

"Canadian Office Action", dated Jun. 7, 2005, Application No. 2,415,563, "Electromagnetic Wave Resistivity Tool With a Tilted Antenna", filed Jul. 10, 2001, 2 pgs.

"Canadian Office Action", dated Jul. 21, 2003, Appl No. 2,359,371, "Electromagnetic Wave Resistivity Tool Having a Tilted Antenna for Determining the Horizontal and Vertical Resistivities and Relative Dip Angle in Anisotropic Earth Formations", Jan. 24, 2000, 1 pg.

(56) References Cited

OTHER PUBLICATIONS

"Canadian Office Action", dated Nov. 1, 2007, Application No. 2,415,563, "Electromagnetic Wave Resistivity Tool With a Tilted Antenna", filed Jan. 10, 2001, 5 pgs.
"European Office Action", dated Jul. 17, 2006, Appl No. 01962294.3, "Electromagnetic Wave Resistivity Tool Having a Tilted Antenna for Determining the Horizontal and Vertical Resistivities and Relative Dip Angle in Anisotropic Earth Form . . . ", filed Jul. 10, 2001, 2 pgs.
"European Office Action", dated Apr. 29, 2008, Application No. 00908351.0, "Electromagnetic Wave Resistivity Tool Having Tilted Antenna", filed Jan. 24, 2000, 5 pgs.
"European Office Action", dated Jul. 17, 2006, Appl No. 01 096 294.3, Electromagnetic Wave Resistivity Tool Having a Tilted Antenna for Determining the Horizontal and Vertical Resistivities and Relative Dip Angle in Anisotropic Earth Formations, Jul. 10, 2001, 2 pgs.
"European Office Action", dated Jul. 31, 2007, Appl No. 00908351.0, "Electromagnetic Wave Resistivity Tool Having a Tilted Antenna for Determining the Horizontal and Vertical Resistivities and Relative Dip Angle in Anisotropic Earth Formations" filed Jan. 24, 2000, 5 pgs.
"European Office Action", dated Jul. 31, 2007, Application No. 00908351.0, "Electromagnetic Wave Resistivity Tool Having Tilted Antenna", filed Jan. 24, 2000, 42 pgs.
"European Office Action", dated Sep. 13, 2007, Appl No. 01962294.3, "Electromagnetic Wave Resistivity Tool Having a Tilted Antenna for Determining the Horizontal and Vertical Resistivities and Relative Dip Angle in Anisotropic Earth Formations", filed Jul. 10, 2001, 4 pgs.
"European Office Action", dated Sep. 23, 3008, Appl No. 01096 294.3, Electromagnetic wave resistivity tool having a tilted antenna for determining the horizontal and vertical resistivities and relative dip angle in anisotropic earth formations Jul. 10, 2001, 4 pgs.
"European Search Report", dated Sep. 25, 2009, Appl No. 09166566.1, "Electromagnetic Wave Resistivity Tool Having a Tilted Antenna for Determining the Horizontal and Vertical Resistivities and Relative Dip Angle in Anisotropic Earth Formations", filed Jul. 28, 2009, 7 pgs.
"European Search Report", dated Nov. 17, 2009, Appl No. 09166404.5, "Electromagnetic Wave Resistivity tool Having a Tilted Antenna for Determining the Horizontal and Vertical Resistivities and Relative Dip Angle in Anisotropic Earth Formations", filed Jul. 24, 2009, 4 pgs.
"European Search Report", dated Nov. 20, 2009, Appl No. 09166405.2, "Electromagnetic Wave Resistivity Tool Having a Tilted Antenna for Determining the Horizontal and Vertical Resistivities and Related Dip Angle in Anisotropic Earth Formations", filed Jul. 24, 2009, 6 pgs.
"European Search Report", dated Dec. 14, 2009, Appl No. 09166566.1, "Electromagnetic Wave Resistivity Tool Having a Tilted Antenna for Determining the Horizontal and Vertical Resistivities and Relative Dip Angle in Anisotropic Earth Formations", filed Jul. 28, 2009, 9 pgs.
"European Supplemental Search Report", dated Jun. 12, 2003 Appl No. 00908351.0, "Electromagnetic Wave Resistivity Tool Having a Tilted Antenna for Determining the Horizontal and Vertical Resistivities and Relative Dip Angle in Anisotropic Earth Formations", Jan. 24, 2000, 2 pgs.
"Eurpoean Office Action", dated Sep. 27, 2005, Appl No. 01962294.3, "Electromagnetic Wave Resistivity Tool Having a Tilted Antenna for Determining the Horizontal and Vertical Resistivities and Relative Dip Angle in Anisotropic Earth Formations", filed Jul. 10, 2001, 5 pgs.
"Indonisia First Office Action", dated Sep. 2009, Appl No. WO0200803740, Method and Apparatus for Building a Tilted Antenna, filed Nov. 19, 2008, 2 pgs.
"No Office Action", dated Apr. 3, 2009, Application No. 2001 3707, "Electromagnetic Wave Resistivity Tool Having a Tilted Antenna for Determining the Horizontal and Vertical Resistivities and Relative Dip Angle in Anisotropic Earth Formations", filed Jan. 24, 2000, 5 pgs.
"PCT International Preliminary Examination Report", dated Nov. 4, 2002, Appl No. PCT/US01/41319 "Electromagnetic Wave Resistivity Tool Having a Tilted Antenna for Geosteering Within a Desired Payzone", filed Jul. 10, 2001, 30 pgs.
"PCT International Preliminary Report on Patentability", dated Oct. 1, 2009, Appl No. PCT/US07/064221, "Robust Inversion Systems and Methods for Azimuthally Sensitive Resistivity Logging Tools", filed Mar. 16, 2007, 2 pgs.
"PCT International Search Report and Written Opinion", dated Feb. 10, 2009, Appl No. PCT/US08/87021, Azimuthal At-Bit Resistivity and Geosteering Methods and Systems, filed Dec. 16, 2008, 9 pgs.
"PCT International Search Report and Written Opinion", dated May 15, 2000, Appl No. PCT/US00/01693, "Electromagnetic Wave Resistivity Tool Having a Tilted Antenna for Determining the Horizontal and Vertical Resistivities and Relative Dip Angle in Anisotropic Earth Formations", Jan. 24, 2000, 38 pgs.
"PCT International Search Report and Written Opinion", dated Jun. 27, 2008, Appl No. PCT/US08/51447, EM-Guided Drilling Relative to an Existing Borehole, 8 pgs.
"PCT International Search Report", dated Jan. 31, 2008, Appl No. PCT/US07/15806, "Modular Geosteering Tool Assembly", filed Jul. 11, 2007, 27 pgs.
"PCT International Search Report", dated Feb. 5, 2008, Appl No. PCT/US07/64221, "Robust Inversion Systems and Methods for Azimuthally Sensitive Resistivity Logging Tools", filed Mar. 16, 2007, 1 pg.
"PCT International Search Report", dated Feb. 27, 2008, Appl No. PCT/US07/75455, "Resistivity Logging with Reduced Dip Artifacts", filed Aug. 8, 2007, 18 pgs.
"PCT International Search Report", dated Apr. 30, 2008, Appl No. PCT/US06/62149, "Antenna Coupling Component Measurement Tool Having a Rotating Antenna Configuration", filed Dec. 15, 2006, 3 pgs.
"PCT International Search Report", dated May 15, 2002, Appl No. PCT/US00/01693, Electromagnetic Wave Resistivity Tool Having a Tilted Antenna for Determining the Horizontal and Vertical Resistivities and Relative Dip Angle in Anisotropic Earth Formations, Jan. 24, 2000, 4 pgs.
"PCT International Search Report", dated May 15, 2008, Appl No. PCT/US07/15744, "Method and Apparatus for Building a Tilted Antenna", filed Jul. 11, 2007, 2 pgs.
"PCT International Search Report", dated Sep. 18, 2001, Appl No. US01/41319, "Electromagnetic Wave Resistivity Tool Having a Tilted Antenna for Determining the Horizontal and Vertical Resistivities and Relative Dip Angle in Anisotropic Earth Formations", Aug. 6, 2002, 5 pgs.
"PCT Written Opinion of the International Searching Authority", dated Feb. 5, 2008, Appl No. PCT/US07/64221, "Robust Inversion systems and Methods for Azimuthally Sensitive Resistivity Logging Tools", filed Mar. 16, 2007, 4 pgs.
"PCT Written Opinion of the International Searching Authority", dated Aug. 6, 2002, Appl No. PCT/US01/41319, "Electromagnetic Wave Resistivity Tool Having a Tilted Antenna for Geosteering Within a Desired Payzone", filed Jul. 10, 2001, 5 pgs.
"Russian Office Action", dated Jul. 9, 2009, Appl No. 2009104466, Modular Geosteering Tool Assembly, filed Feb. 10, 2009, 8 pgs.
"US Advisory Action", dated Apr. 13, 2007, U.S. Appl. No. 11/457,709, "Electromagnetic Wave Resistivity Tool Having a Tilted Antenna for Geosteering Within a Desired Payzone", filed Jul. 14, 2006, 3 pgs.
"US Advisory Action", dated Sep. 15, 2005, U.S. Appl. No. 10/616,429, "Electromagnetic Wave Resistivity Tool Having a Tilted Antenna for Geosteering Within a Desired Payzone", filed Jul. 9, 2003, 14 pgs.
"US Final Office Action", dated Jan. 19, 2007, U.S. Appl. No. 11/457,709, "Electromagnetic Wave Resistivity Tool Having a Tilted Antenna for Geosteering Within a Desired Payzone", filed Jul. 14, 2006, 31 pgs.

(56) References Cited

OTHER PUBLICATIONS

"US Final Office Action", dated Jun. 6, 2005, U.S. Appl. No. 10/616,429, "Electromagnetic Wave Resistivity Tool Having a Tilted Antenna for Geosteering Within a Desired Payzone", filed Jul. 9, 2003, 27 pgs.
"US Final Office Action", dated Jun. 16, 2004, U.S. Appl. No. 10/255,048, "Electromagnetic Wave Resistivity Tool Having a Tilted Antenna for Determining the Horizontal and Vertical Resistivities and Relative Dip Angle in Anisotropic Earth Formations", Sep. 25, 2002, 8 pgs.
"US Non-Final Office Action", dated Feb. 24, 2009, U.S. Appl. No. 12/127,634, "Electromagnetic Wave Resistivity Tool Having a Tilted Antenna for Determining the Horizontal and Vertical Resistivities and Relative Dip Angle in Anisotropic Earth Formations", filed May 27, 2008, 29 pgs.
"US Non-Final Office Action", dated Apr. 26, 2000, Appl No. 09/23832, "Electromagnetic Wave Resistivity Tool Having a Tilted Antenna for Determining the Horizontal and Vertical Resistivities and Relative Dip Angle in Anisotropic Earth Formations", filed Jan. 28, 1999, 8 pgs.
"US Non-Final Office Action", dated Jul. 28, 2003, U.S. Appl. No. 10/255,048, "Electromagnetic Wave Resistivity Tool Having a Tilted Antenna for Determining the Horizontal and Vertical Resistivities and Relative Dip Angle in Anisotropic Earth Formations", Sep. 25, 2002, 6 pgs.
"US Non-Final Office Action", dated Aug. 18, 2006, U.S. Appl. No. 11/457,709, "Electromagnetic Wave Resistivity Tool Having a Tilted Antenna for Geosteering Within a Desired Payzone", filed Jul. 14, 2006, 13 pgs.
"US Non-Final Office Action", dated Aug. 26, 2004, Application No. Jul. 9, 2003, "Electromagnetic Wave Resistivity Tool Having a Tilted Antenna for Geosteering Within a Desired Payzone", filed Jul. 9, 2003, 11 pgs.
"US Non-Final Office Action", dated Sep. 6, 2007, U.S. Appl. No. 11/745,822, "Electromagnetic Wave Resistivity Tool Having a Tilted Antenna for Geosteering Within a Desired Payzone", filed May 8, 2007, 31 pgs.
"US Non-Final Office Action", dated Dec. 21, 2005, U.S. Appl. No. 11/198,066, "Electromagnetic Wave Resistivity Tool Having a Tilted Antenna for Determining the Horizontal and Vertical Resistivities and Relative Dip Angle in Anisotropic Earth", filed Aug. 5, 2005, 15 pgs.
Bell, C. et al., "Navigating and Imaging in Complex Geology With Azimuthal Propagation Resistivity While Drilling", 2006 SPE Annual Technical Conference and Exhibition, SPE 102637, San Antonio, TX, USA, (Sep. 24, 2006),pp. 1-14.
Bittar, Michael S., "A New Azimuthal Deep-Reading Resistivity Tool for Geosteering and Advanced Formation Evaluation", 2007 SPE Annual Technical Conference and Exhibition, SPE 109971, Anaheim, CA, USA, (Nov. 11, 2007), pp. 1-9.
Bittar, Michael S., "Processing Resistivity Logs", U.S. Appl. No. 60/821,721, filed Aug. 8, 2006.
Bittar, Michael S., "Resistivity Logging with Reduced Dip Artifacts", PCT Patent Appl US2007/075455, filed Aug. 8, 2006, 24 pgs.
Bittar, Michael S., "US PRV Application", U.S. Appl. No. 60/821,988, "Tool for Azimuthal Resistivity Measurement and Bed Boundary Detection", filed Aug. 10, 2006.
Bittar, Michael S., et al., "A True Multiple Depth of Investigation Electromagnetic Wave Resistivity Sensor: Theory, Experiment, and Prototype Field Test Results", SPE 22705, 66th Annual Technical Conference and Exhibition of the SPE, Dallas, TX, (Oct. 6, 1991), pp. 1-8, plus 10 pgs of Figures.
Bittar, Michael S., et al., "Invasion Profiling with a Multiple Depth of Investigation, Electromagnetic Wave Resistivity Sensor", SPE 28425, 69th Annual Technical Conference and Exhibition of the SPE, New Orleans, LA, (Sep. 25, 1994),pp. 1-12, plus 11 pgs of Figures.
Bittar, Michael S., et al., "The Effects of Rock Anisotropy on MWD Electromagnetic Wave Resistivity Sensors", The Log Analyst, (Jan. 1996), pp. 20-30.

Bittar, Michael S., et al., "The Effects of Rock Anisotropy on MWD Electromagnetic Wave Resistivity Sensors", SPWLA 35th Annual Logging Symposium, (Jun. 19, 1994), 18 pgs.
Bonner, S. et al., "A New Generation of Electrode Resistivity Measurements for Formation Evaluation While Drilling", SPWLA 35th Annual Logging Symposium, (Jun. 19, 1994), pp. 1-19.
Bonner, Steve et al., "Measurements at the Bit: A New Generation of MWD Tools", Oilfield Review, (Apr. 1993), pp. 44-54.
Clark, Brian et al., "A Dual Depth Resistivity Measurement for Fewd", SPWLA 29th Annual Logging Symposium, (Jun. 1988), 25 pgs.
Clark, Brian et al., "Electromagnetic Propagation Logging While Drilling: Theory and Experiment", SPE Formation Evaluation, (Sep. 1990), pp. 263-271.
Finger, J. T., et al., "Development of a System for Diagnostic-While-Drilling (DWD)", SPE/IADC Drilling Conference, SPE/IADC 79884, Amsterdam, The Netherlands, (Feb. 19, 2003), 9 pgs.
Hagiwara, T. "A New Method to Determine Horizontal-Resistivity in Anisotropic Formations Without Prior Knowledge of Relative Dip", 37th Annual SPWLA Logging Symposium, New Orleans, LA, (Jun. 16, 1996),pp. 1-5 , plus 3 pgs of Figs.
Halliburton Energy Services, Inc, "Sperry Drilling Services Facilities", Houston, TX, www.Halliburton.com, (Nov. 11, 2008), pp. 1-5.
Hayes, Dan "Steering into New Horizons", E&P Magazine, http://www.epmag.com/archives/print/4052.htm, (Jun. 1, 2000), pp. 1-3.
Li, Qiming et al., "New Directional Electromagnetic Tool for Proactive Geosteering and Accurate Formation Evaluation While Drilling", SPWLA 46th Annual Logging Symposium, New Orleans, LA, USA, (Jun. 26, 2005), pp. 1-16.
Luling, M. et al., "Processing and Modeling 2-MHz Resistivity Tools in Dipping, Laminated, Anisotropic Formations: SPWLA", SPWLA 35th Annual Logging Symposium, paper QQ, (1994), pp. 1-25.
Mack, S. G., et al., "MWD Tool Accurately Measures Four Resistivities", Oil & Gas Journal, (May 25, 1992), pp. 1-5.
Mechetin, V. F., et al., "Temp—A New Dual Electromagnetic and Laterolog Apparatus—Technological Complex", All-Union Research Logging Institute, Ufa, USSR. Ch. Ostrander, Petro Physics Int'l, Dallas, Texas, USA, (Date Unknown), 17 pgs.
Meyer, W. H., "New Two Frequency Propagation Resistivity Tools", SPWLA 36th Annual Logging Symposium, (Jun. 26-29, 1995),12 pgs.
Pitcher, J. et al., "A New Azimuthal Gamma at Bit Imaging Tool for Geosteering", SPE/IADC Drilling Conference and Exhibition, SPE/IADC 118328, Amsterdam, The Netherlands, (Mar. 17, 2009), pp. 1-8.
Roberts, T. S., et al., "Optimization of PDC Drill Bit Performance Utilizing High-Speed, Real-Ti9me Downhole Data Acquired Under a Cooperative Research and Development Agreement", SPE/IADC Drilling Conference, SPE/IADC 91782, Amsterdam, The Netherlands, (Feb. 23, 2005), 14 pgs.
Rodney, Paul F., et al., "Electromagnetic Wave Resistivity MWD Tool", SPE Drilling Engineering, (Oct. 1986), pp. 37-346.
Zhu, Tianfei et al., "Two Dimensional Velocity Inversion and Synthetic Seismogram Computation", Geophysics, vol. 52, No. 1, (Jan. 1987), pp. 37-49.
Barriol, Yves et al., "The Pressures of Drilling and Production", Oilfield Review, Autumn 2005, pp. 22-41.
Bonner, Steve et al., "Resistivity While Drilling—Images from the String", Oilfield Review, Spring 1996, pp. 4-19.
Chou, Lawrence et al., "Steering Toward Enhanced Production", Oilfield Review, Autumn 2006, pp. 54-63.
EP Non-Final Office Action, dated Dec. 30, 2009, Appl No. 01 962 294.03, Electromagnetic Wave Resistivity Tool Having a Tilted Antenna for Geosteering Within a Desired Payzone, filed Jul. 1, 2001, 3 pgs.
European Search Report, dated Oct. 16, 2009, Appl No. 09166567.9, Electromagnetic Wave Resistivity Tool Having a Tilted Antenna, filed Jul. 28, 2009, 5 pgs.
Li, Qiming et al., "New Directional Electromagnetic Tool for Proactive Geosteering and Accurate Formation Evaluation While Drilling", SPWLA 46th Annual Logging Symposium, Paper UU, Jun. 26-29, 2005, pp. 1-16.

(56) References Cited

OTHER PUBLICATIONS

Luling, Martin et al., "Processing and Modeling 2-MHz Resistivity Tools", SPWLA 35th Annual Logging Symposium, Paper QQ, Jun. 19-22, 1994, pp. 1-25.
PCT International Preliminary Report on Patentability, dated Apr. 30, 2008, Appl No. PCT/US06/62149, "Antenna Coupling Component Measurement Tool Having a Rotating Antenna Configuration", filed Dec. 15, 2006, 6 pgs.
PCT International Search Report and Written Opinion, dated Aug. 15, 2008, Appl No. PCT/US08/61571, "Multimodal Geosteering Systems and Methods", filed Apr. 25, 2008, 8 pgs.
Preliminary Report on Patentability, dated Jul. 29, 2010, Appl No. PCT/US08/51447, "EM-Guided Drilling Relative to an Existing Borehole", filed Jan. 18, 2008, 7 pgs.
US Final Office Action, dated Oct. 15, 2010, U.S. Appl. No. 12/467,427, "Electromagnetic Wave Resistivity Tool Having a Tilted Antenna for Determining the Horizontal and Vertical Resistivities and Relative Dip Angle in Anisotropic Earth Formations", May 18, 2009, 24 pgs.
US Final Office Action, dated Oct. 22, 2010, U.S. Appl. No. 12/467,434, "Electromagnetic Wave Resistivity Tool Having a Tilted Antenna for Geosteering Within a Desired Payzone", filed May 18, 2009, 19 pgs.
US Non-Final Office Action, dated Mar. 15, 2010, U.S. Appl No. 12/467,427, "Electromagnetic Wave Resistivity Tool Having a Tilted Antenna for Determining the Horizontal and Vertical Resistivities and Relative Dip Angle in Anisotropic Earth Formations", filed May 18, 2009 25 pgs.
US Non-Final Office Action, dated Jun. 3, 2010, U.S. Appl. No. 12/467,434, "Electromagnetic Wave Resistivity Tool Having a Tilted Antenna for Geosteering Within a Desired Payzone", filed May 18, 2009, 19 pgs.
US Final Office Action, dated Jul. 7, 2011, U.S. Appl. No. 12/299,760, "Robust Inversion Systems and Methods for Azimuthally Sensitive Resistivity Logging Tools", filed Nov. 5, 2008, 16 pgs.
Moran, J. H. et al., "Effects of formation anisotropy on resistivity-logging measurements", Geophysics, vol. 44, No. 7 (Jul. 1979): p. 1266-1286, 21 pgs.
Sato, Motoyuki, et al., "Directional Induction Logging Methods", SPWLA 35th Annual Logging Symposium, (Jun. 19-22, 1994),16 pgs.
Kashihara, Koji, et al., "Proposal of a Directional Induction Tool", The First Annual Well Logging Symposium of Japan, (Sep. 21-22, 1995),8 pgs.
Lyons, William C., "Standard Handbook of Petroleum & Natural Gas Engineering", Gulf Publishing Company, Houston, Texas, vol. 1, (1996), pp. 497-498, & 979-980.
US Non-Final Office Action, dated Sep. 21, 2012, U.S. Appl. No. 13/095,420, "Electromagnetic Wave Resistivity Tool Having a Tilted Antenna for Determining the Horizontal and Vertical Resistivities and Relative Dip Angle in Anisotropic Earth Formations", filed Apr. 7, 2011, 36 pgs.

UK IPO Office Action, dated Oct. 11, 2012, Appl No. GB1015245.2, "Azimuthal At-Bit Resistivity and Geosteering Methods and Systems", filed Sep. 13, 2010, 3 pgs.
US Non-Final Office Action, dated Nov. 2, 2012, U.S. Appl. No. 12/526,552, "EM-Guided Drilling Relative to an Existing Borehole", filed Sep. 26, 2010, 9 pgs.
Final Office Action, dated Dec. 31, 2012, U.S. Appl. No. 12/373,558, "Resistivity Logging with Reduced Dip Artifacts", filed Aug. 8, 2007, 18 pgs.
US Final Office Action, dated Mar. 26, 2013, U.S. Appl. No. 12/526,552, "EM-Guided Drilling Relative to an Existing Borehole", filed Sep. 26, 2010, 11 pgs.
US Final Office Action, dated Apr. 2, 2013, U.S. Appl. No. 13/095,420, "Electromagnetic Wave Resistivity Tool Having a Tilted Antenna for Determining the Horizontal and Vertical Resistivities and Relative Dip Angle in Anisotropic Earth Formations", filed Apr. 7, 2011, 32 pgs.
In First Examination Report, dated Apr. 12, 2013, Appl No. 1232/DELNP/2008, "Electromagnetic Resistivity Logging Systems and Logging Methods Relating Thereto", filed Dec. 15, 2006.
US Advisory Action, dated Jun. 4, 2013, U.S. Appl. No. 12/526,552, "EM-Guided Drilling Relative to an Existing Borehole", filed Jan. 18, 2008, 4 pgs.
US Non-Final Office Action, dated Sep. 30, 2013, U.S. Appl. No. 12/526,552, "EM-Guided Drilling Relative to an Existing Borehole", filed Jan. 18, 2008, 11 pgs.
US Final Office Action, dated Sep. 30, 2013, U.S. Appl. No. 13/095,420, "Electromagnetic Wave Resistivity Tool Having a Tilted Antenna for Determining the Horizontal and Vertical Resistivities and Relative Dip Angle in Anisotropic Earth Formations", filed Apr. 27, 2011, 31 pgs.
CN First Office Action, dated Oct. 23, 2013, Appl No. 200880127677.4, "Azimuthal At-Bit Resistivity and Geosteering Methods and Systems", filed Aug. 30, 2010, 14 pgs.
CN Office Action, dated Dec. 29, 2015, Appl No. 200880127677.4, "Azimuthal At-Bit Resistivity and Geosteering Methods and Systems", filed Aug. 30, 2010, 4 pgs.
CA 4th Examiner's Letter, dated Mar. 2, 2015, Appl. No. 2,689,859, "Electromagnetic Wave Resistivity Tool With Tilted Antenna," Filed Jan. 15, 2010, 3 pgs.
US Non-Final Office Action, dated Jun. 5, 2015, U.S. Appl. No. 13/524,158, "Modular Geosteering Tool Assembly," filed Jun. 15, 2012, 13 pgs.
US Final Office Action, dated May 29, 2014, U.S. Appl. No. 12/526,552, "EM-Guided Drilling Relative to an Existing Borehole," filed Jan. 18, 2008, 14 pgs.
US Final Office Action, dated Oct. 3, 2014, U.S. Appl. No. 13/524,158, "Modular Geosteering Tool Assembly," filed Jun. 15, 2012.
Barkved, Olav, et al., "Valhall Field—Still on Plateau after 20 Years of Production," Barkved, O., Heavey, P., Kjelstadli, R., Kleppan, T., & Kristiansen, T. G. (Jan. 1, 2003). Valhall Field—Still on Plateau after 20 Years of Production. Society of Petroleum Engineers. doi:10.2118/83957-MS.

* cited by examiner

TOOL FOR AZIMUTHAL RESISTIVITY MEASUREMENT AND BED BOUNDARY DETECTION

CROSS-REFERENCE TO RELATED APPLICATIONS

The present application is a divisional application of parent U.S. patent application Ser. No. 11/835,619, filed Aug. 8, 2007, by Michael Bittar, which claims priority to Prov. U.S. Patent App. 60/821,721, filed Aug. 8, 2006, and titled "Processing Resistivity Logs" by inventor Michael Bittar, and to Prov. U.S. Patent App. 60/821,988, filed Aug. 10, 2006, and titled "Tool for Azimuthal Resistivity Measurement and Bed Boundary Detection" by the same inventor. In addition, the parent application is a continuation-in-part of:

issued U.S. Pat. No. 7,265,552, filed Jul. 14, 2006, and titled "Electromagnetic Wave
Resistivity Tool Having a Tilted Antenna for Geosteering Within a Desired Payzone," which is a continuation of
issued U.S. Pat. No. 7,138,803, filed Aug. 5, 2005, which is a continuation of
issued U.S. Pat. No. 7,019,528, filed Jul. 9, 2003, which is a continuation of
issued U.S. Pat. No. 6,911,824, filed Sep. 25, 2002, which is a continuation of
issued U.S. Pat. No. 6,476,609, filed Jul. 13, 2000, which is a continuation-in-part of
issued U.S. Pat. No. 6,163,155, filed Jan. 28, 1999.

Finally, the parent application relates to co-pending U.S. patent application Ser. No. 12/373,558, with title "Resistivity Logging with Reduced Dip Artifacts" which is a US national stage application of PCT/US2007/075455, filed Aug. 8, 2007 by inventor Michael Bittar. Each of the foregoing patents and applications is hereby incorporated herein by reference.

BACKGROUND

The gathering of downhole information has been done by the oil industry for many years. Modern petroleum drilling and production operations demand a great quantity of information relating to the parameters and conditions downhole. Such information typically includes the location and orientation of the borehole and drilling assembly, earth formation properties, and drilling environment parameters downhole. The collection of information relating to formation properties and conditions downhole is commonly referred to as "logging", and can be performed during the drilling process itself.

Various measurement tools exist for use in wireline logging and logging while drilling. One such tool is the resistivity tool, which includes one or more antennas for transmitting an electromagnetic signal into the formation and one or more antennas for receiving a formation response. When operated at low frequencies, the resistivity tool may be called an "induction" tool, and at high frequencies it may be called an electromagnetic wave propagation tool. Though the physical phenomena that dominate the measurement may vary with frequency, the operating principles for the tool are consistent. In some cases, the amplitude and/or the phase of the receive signals are compared to the amplitude and/or phase of the transmit signals to measure the formation resistivity. In other cases, the amplitude and/or phase of the receive signals are compared to each other to measure the formation resistivity.

When plotted as a function of depth or tool position in the borehole, the resistivity tool measurements are termed "logs" or "resistivity logs". Such logs may provide indications of hydrocarbon concentrations and other information useful to drillers and completion engineers. In particular, azimuthally-sensitive logs may provide information useful for steering the drilling assembly. However, there exist limitations on the size and length of the drilling assembly which may limit the number of logging tools that can be included, and hence may limit the types of measurements that can be logged.

BRIEF DESCRIPTION OF THE DRAWINGS

For a detailed description of the various disclosed embodiments, reference will now be made to the accompanying drawings in which.

While the described embodiments are susceptible to various modifications and alternative forms, specific examples thereof are shown for illustrative purposes and will be described in detail below. It should be understood, however, that the drawings and detailed description thereto are not intended to limit the claims to the particular examples described, but on the contrary, the intention is to cover all modifications, equivalents and alternatives falling within the spirit and scope of the present invention as defined by the appended claims.

NOTATION AND NOMENCLATURE

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct electrical connection. Thus, if a first device couples to a second device, that connection may be through a direct electrical connection, or through an indirect electrical connection via other devices and connections. In addition, the term "attached" is intended to mean either an indirect or a direct physical connection. Thus, if a first device attaches to a second device, that connection may be through a direct physical connection, or through an indirect physical connection via other devices and connections.

DETAILED DESCRIPTION

The issues identified in the background are at least partly addressed by systems and methods for performing bed boundary detection and azimuthal resistivity logging with a single tool. Some method embodiments include logging a borehole with an azimuthally-sensitive resistivity logging tool; deriving both a resistivity log and a boundary detection signal from measurements provided by said tool; and displaying at least one of the boundary detection signal and the resistivity log. The resistivity log measurements may be compensated logs, i.e., logs derived from measurements by one or more symmetric transmitter-receiver arrangements. Though symmetric arrangements can also serve as the basis for the boundary detection signal, a greater depth of investigation can be obtained with an asymmetric arrangement. Hence the boundary detection signal may be uncompensated.

Figure 1:
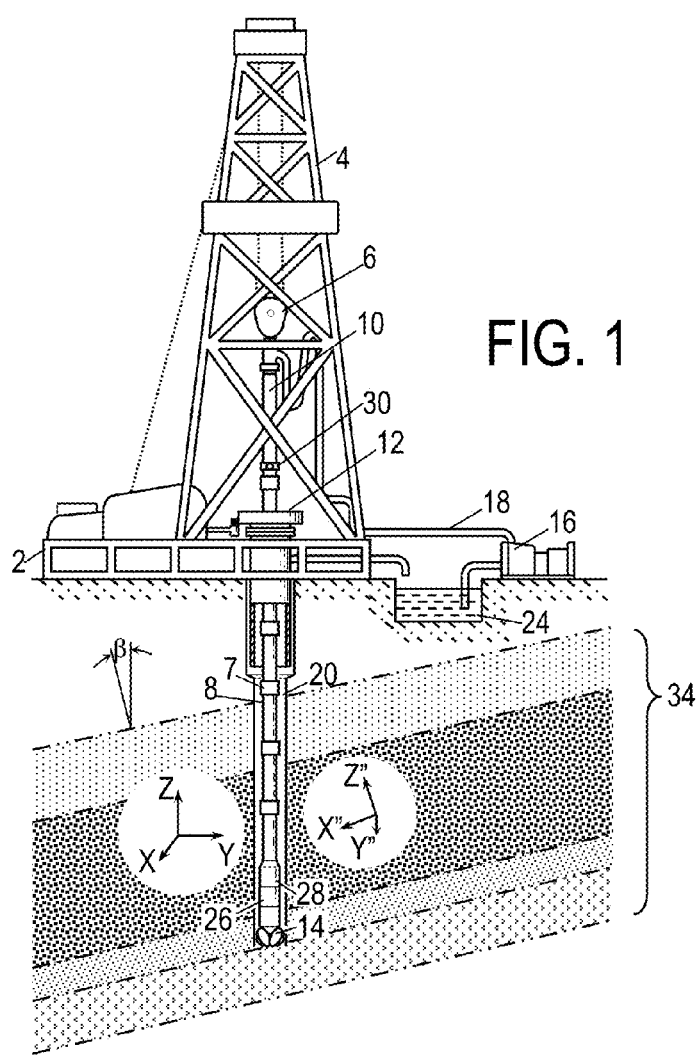
FIG. 1 shows an illustrative logging while drilling environment.

To illustrate a context for the disclosed systems and methods, FIG. 1 shows a well during drilling operations. A drilling platform 2 is equipped with a derrick 4 that supports a hoist 6. Drilling of oil and gas wells is carried out by a string of drill pipes connected together by "tool" joints 7 so as to form a drill string 8. The hoist 6 suspends a kelly 10 that lowers the drill string 8 through rotary table 12. Connected to the lower end of the drill string 8 is a drill bit 14. The bit 14 is rotated and drilling accomplished by rotating the drill string 8, by use of a downhole motor near the drill bit, or by both methods.

Drilling fluid, termed mud, is pumped by mud recirculation equipment 16 through supply pipe 18, through drilling kelly 10, and down through the drill string 8 at high pressures and volumes to emerge through nozzles or jets in the drill bit 14. The mud then travels back up the hole via the annulus formed between the exterior of the drill string 8 and the borehole wall 20, through a blowout preventer, and into a mud pit 24 on the surface. On the surface, the drilling mud is cleaned and then recirculated by recirculation equipment 16.

For logging while drilling (LWD), downhole sensors 26 are located in the drillstring 8 near the drill bit 14. Sensors 26 include directional instrumentation and a modular resistivity tool with tilted antennas for detecting bed boundaries. The directional instrumentation measures the inclination angle, the horizontal angle, and the azimuthal angle (also known as the rotational or "tool face" angle) of the LWD tools. As is commonly defined in the art, the inclination angle is the deviation from vertically downward, the horizontal angle is the angle in a horizontal plane from true North, and the tool face angle is the orientation (rotational about the tool axis) angle from the high side of the well bore. In some embodiments, directional measurements are made as follows: a three axis accelerometer measures the earth's gravitational field vector relative to the tool axis and a point on the circumference of the tool called the "tool face scribe line". (The tool face scribe line is drawn on the tool surface as a line parallel to the tool axis.) From this measurement, the inclination and tool face angle of the LWD tool can be determined. Additionally, a three axis magnetometer measures the earth's magnetic field vector in a similar manner. From the combined magnetometer and accelerometer data, the horizontal angle of the LWD tool can be determined. In addition, a gyroscope or other form of inertial sensor may be incorporated to perform position measurements and further refine the orientation measurements.

In a some embodiments, downhole sensors 26 are coupled to a telemetry transmitter 28 that transmits telemetry signals by modulating the mud flow in drill string 8. A telemetry receiver 30 is coupled to the kelly 10 to receive transmitted telemetry signals. Other telemetry transmission techniques are well known and may be used. The receiver 30 communicates the telemetry to a surface installation (not shown) that processes and stores the measurements. The surface installation typically includes a computer system of some kind, e.g. a desktop computer, that may be used to inform the driller of the relative position and distance between the drill bit and nearby bed boundaries.

The drill bit 14 is shown penetrating a formation having a series of layered beds 34 dipping at an angle. A first (x,y,z) coordinate system associated with the sensors 26 is shown, and a second coordinate system (x",y",z") associated with the beds 32 is shown. The bed coordinate system has the z" axis perpendicular to the bedding plane, has the y" axis in a horizontal plane, and has the x" axis pointing "downhill". The angle between the z-axes of the two coordinate systems is referred to as the "dip" and is shown in FIG. 1 as the angle β.

Figure 2:
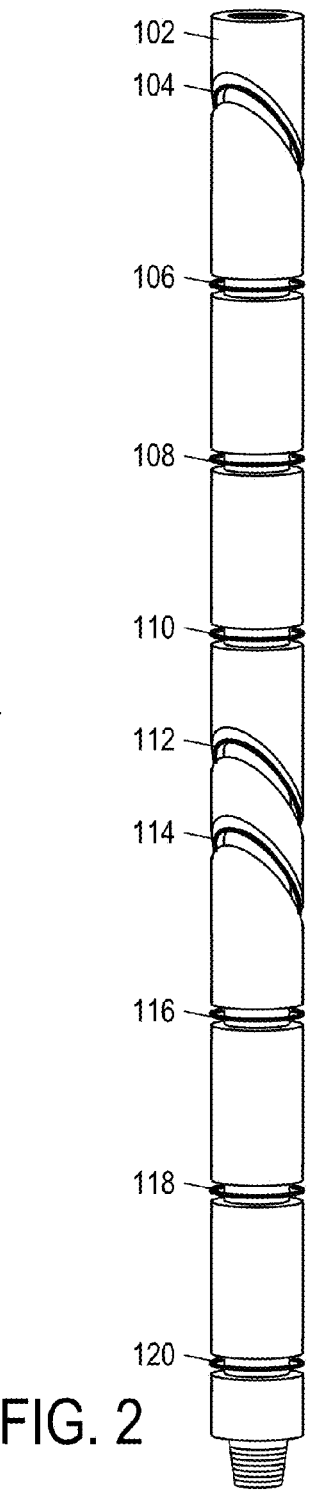
FIG. 2 shows an illustrative resistivity logging tool in accordance with some invention embodiments.

Referring now to FIG. 2, an illustrative resistivity tool 102 is shown. The tool 102 is provided with one or more regions of reduced diameter for suspending a wire coil. The wire coil is placed in the region and spaced away from the tool surface by a constant distance. To mechanically support and protect the coil, a non-conductive filler material (not shown) such as epoxy, rubber, fiberglass, or ceramics may be used to fill in the reduced diameter regions. The transmitter and receiver coils may comprise as little as one loop of wire, although more loops may provide additional signal power. The distance between the coils and the tool surface is preferably in the range from $\frac{1}{16}$ inch to $\frac{3}{4}$ inch, but may be larger.

Figure 3:
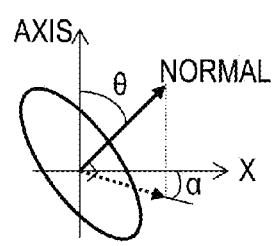
FIG. 3 shows a coordinate system for describing antenna orientation.

The illustrated resistivity tool 102 has six coaxial transmitters 106 (T5), 108 (T3), 110 (T1), 116 (T2), 118 (T4), and 120 (T6), meaning that the axes of these transmitters coincide with the longitudinal axis of the tool. In addition, tool 102 has three tilted receiver antennas 104 (R3), 112 (R1), and 114 (R2). The term "tilted" indicates that the plane of the coil is not perpendicular to the longitudinal tool axis. (FIG. 3 shows an antenna that lies within a plane having a normal vector at an angle of θ with the tool axis and at an azimuth of α with respect to the tool face scribe line. When θ equals zero, the antenna is said to be coaxial, and when θ is greater than zero the antenna is said to be tilted.) The spacing of the antennas may be stated in terms of a length parameter x, which in some embodiments is about 16 inches. Measuring along the longitudinal axis from a midpoint between the centers of receiver antennas 112 and 114, transmitters 110 and 116 are located at ±1x, transmitters 108 and 118 are located at ±2x, and transmitters 106 and 120 are located at ±3x. The receiver antennas 112 and 114 may be located at ±x/4. In addition, a receiver antenna 104 may be located at plus or minus 4x.

The length parameter and spacing coefficients may be varied as desired to provide greater or lesser depth of investigation, higher spatial resolution, or higher signal to noise ratio. However, with the illustrated spacing, symmetric resistivity measurements can be made with 1x, 2x, and 3x spacing between the tilted receiver antenna pair 112, 114, and the respective transmitter pairs 110 (T1), 116 (T2); 108 (T3), 118 (T4); and 106 (T5), 120 (T6). In addition, asymmetric resistivity measurements can be made with 1x, 2x, 3x, 5x, 6x, and 7x spacing between the tilted receiver antenna 104 and the respective transmitter 106, 108, 110, 116, 118, and 120. This spacing configuration provides tool 102 with some versatility, enabling it to perform deep (but asymmetric) measurements for bed boundary detection and symmetric measurements for accurate azimuthal resistivity determination.

In some contemplated embodiments, the transmitters may be tilted and the receivers may be coaxial, while in other embodiments, both the transmitters and receivers are tilted, though preferably the transmitter and receiver tilt angles are different. Moreover, the roles of transmitter and receiver may be interchanged while preserving the usefulness of the measurements made by the tool. In operation, each of the transmitters are energized in turn, and the phase and amplitude of the resulting voltage induced in each of the receiver coils are measured. From these measurements, or a combination of these measurements, the formation resistivity can be determined.

In the illustrated embodiment of FIG. 2, the receiver coils are tilted with a 45° angle between the normal and the tool axis. Angles other than 45° may be employed, and in some contemplated embodiments, the receiver coils are tilted at unequal angles or are tilted in different azimuthal directions. The tool 102 is rotated during the drilling (and logging) process, so that resistivity measurements can be made with the tilted coils oriented in different azimuthal directions. These measurements may be correlated with tool orientation measurements to enable detection of boundary distances and directions.

Figure 4:
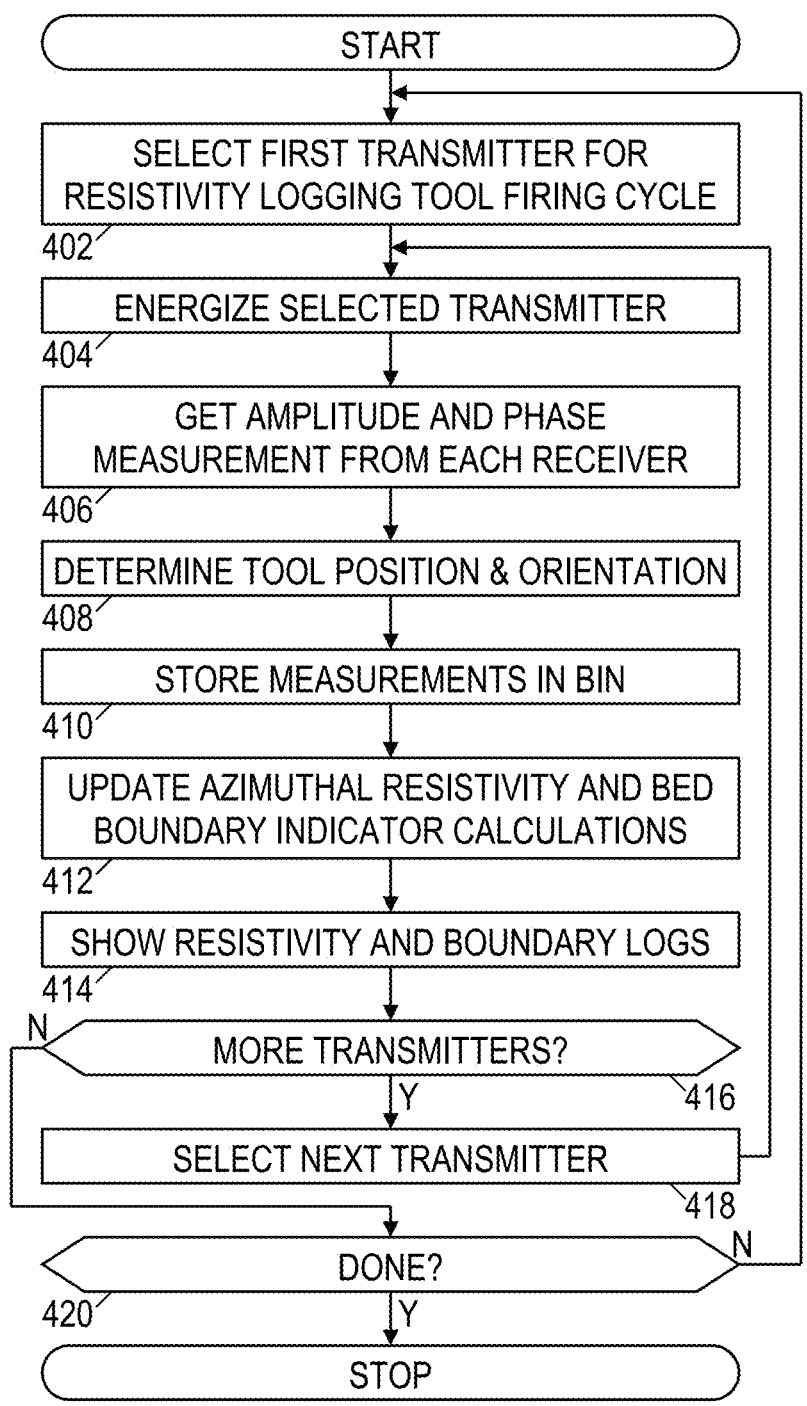
FIG. 4 shows a flow chart of an illustrative logging method.

FIG. 4 shows a flowchart of an illustrative method for generating a resistivity log and bed boundary indicator using the tool of FIG. 2. This method may be performed by a processor in the tool alone or in cooperation with a surface computing facility. Beginning in block 402, a first transmitter is selected. The order in which the transmitters are selected may be designed to minimize the effects of motion on measurements that are to be combined. Thus, for example, transmitters 106 and 120 may be adjacent in the transmitter firing sequence, as may transmitters 108 and 118, and transmitters 110 and 116. Thus when the measurements resulting from the energizing of these transmitter pairs may be combined while requiring minimal or no compensation for tool motion between the firing times of these transmitters.

In block 404 the selected transmitter is energized, and in block 406 the amplitude and phase of the induced receiver voltages are measured. For receiver 104, the amplitude and phase may be measured relative to the voltage signal being applied to the selected transmitter. For receivers 112 and 114, the amplitude and phase may be measured in the same way, or alternatively, the amplitude and phase of one receiver (e.g. 112) may be measured relative to the other receiver (e.g., 114).

In block 408, the tool position and orientation during the amplitude and phase measurements are determined. This position determination may include tool orientation and eccentricity, but at a minimum it includes a determination of the tool's depth or position along the length of the borehole so as to permit later correlation with independent measurements of formation properties from other sources. Tool position may be made using inertial tracking instruments (e.g., accelerometers and gyroscopes), while orientation information may be determined from magnetic field sensors and gravitational field sensors, alone or in combination with inertial tracking instruments. Eccentricity measurements may be made using a borehole caliper tool. In some environments the tool's motion along the borehole (when being withdrawn from the hole) may approach 2 meters/second, while the tool's rotational velocity (during drilling operations) may approach 200 revolutions per minute. To prevent the tool's motion from significantly affecting spatial resolution of the measurements, the measurement period for each transmitter firing is preferably kept below 10 milliseconds.

Figure 6:
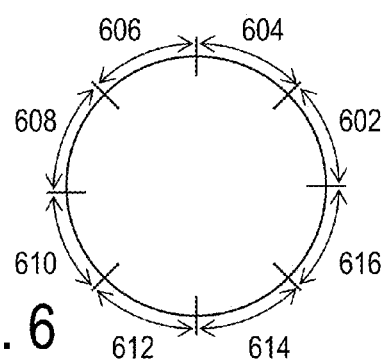
FIG. 6 shows an illustrative set of azimuthal bins.

For display of the resistivity and bed boundary measurements, the borehole surface may be conceptually divided into a grid of "bins". Along the length of the borehole, the grid is evenly divided into sections of the desired vertical resolution. Similarly, in the circumferential direction, the grid is divided into sections of the desired azimuthal resolution. (FIG. 6 shows an illustrative division of the borehole circumference into eight azimuthal sections 602-616.) For each of the bins resulting from this division, it is expected that the logging tool 102 will provide multiple measurements in each bin, assuming reasonable grid dimensions relative to the spatial resolution of the tool 102. Accordingly, in block 410, the amplitude and phase measurements are stored in the appropriate bin. The bin for a given transmitter-receiver measurement may be selected based on the rotational orientation of the tool and the position of the midpoint between transmitter and receiver or, where multiple transmitters and/or receivers are used concurrently, the midpoint between the effective transmitter position and the effective receiver position.

In block 412, a resistivity measurement and a bed boundary indicator measurement are determined or updated for the bin based on the new amplitude and phase measurement and any previous measurements in that bin. Due to the tilted receiver (and/or tilted transmitter) antennas, the resistivity measurements are azimuthally sensitive. The resistivity measurements are determined from the average compensated amplitude and phase measurement of the current bin, possibly in combination with the average compensated measurements for other nearby bins and other measured or estimated formation parameters such as formation strike, dip, and anisotropy. The compensated measurements are determined by averaging measurements resulting from symmetrically spaced transmitters. For example, if the phase differences between receivers 112 (R1), 114 (R2) in response to the first and second transmitters 110 (T1), 116 (T2) are expressed as:

$$\delta_{T1} = \Phi_{R1T1} - \Phi_{R2T1} \qquad (1)$$

$$\delta_{T2} = \Phi_{R2T2} - \Phi_{R1T2}, \qquad (2)$$

then the compensated phase difference is:

$$\delta_C = (\delta_{T1} + \delta_{T1})/2. \qquad (3)$$

This compensated phase difference is averaged with the other compensated phase differences in a bin for the 1x transmitter spacing. The formation resistivity measurement for that bin may be based on the average compensated phase difference in that bin, on the average compensated phase differences for the 2x and 3x transmitter spacings in that bin, and on the average compensated amplitude ratios for all three transmitter spacing measurements in that bin. (The compensated amplitude ratios can be determined using the following equations in place of equations (1) and (3).

$$a_{T1} = \ln(A_{R1T1}) - \ln(A_{R2T1}) \qquad (4)$$

$$a_{T2} = \ln(A_{R2T2}) - \ln(A_{R1T2}) \qquad (5)$$

$$a_C = (a_{T1} + a_{T1})/2, \qquad (6)$$

where, e.g., $A_{R1T2}$ is the amplitude of the signal received by R1 in response to T2.)

Figure 7:
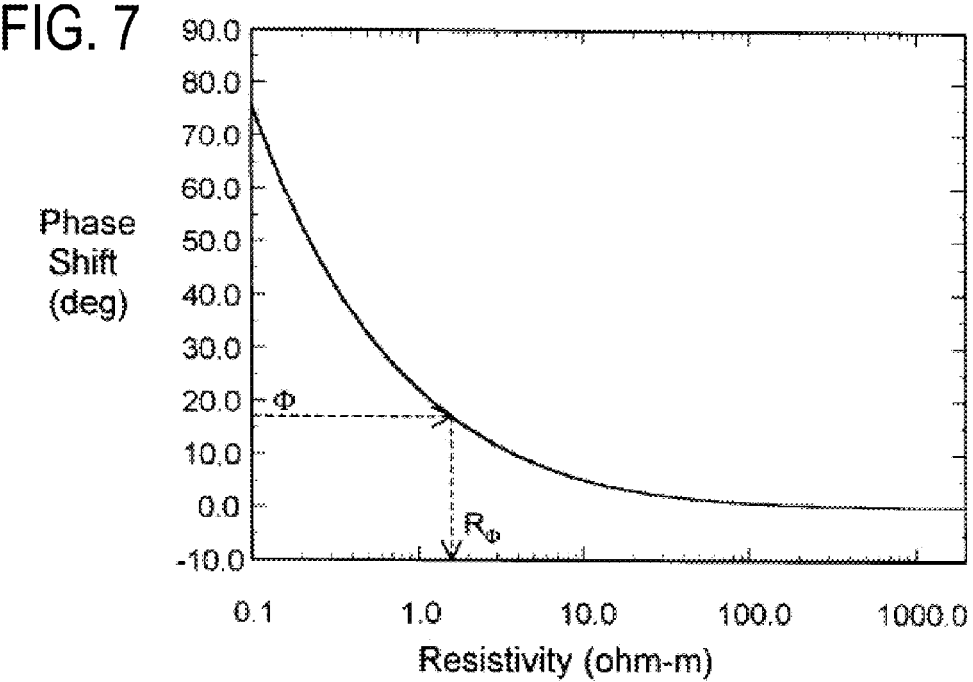
FIG. 7 shows an illustrative conversion between phase and resistivity.

The average compensated phase and amplitude measurements from azimuthally spaced and axially spaced bins may also be included in the resistivity calculation to account for the effects of anisotropic, dipping formations. Conventional look-up table or forward modeling techniques may be used to determine the resistivity measurement. An illustrative conversion of phase measurement to resistivity is shown in FIG. 7, but in practice, the conversion typically involves multiple parameters.

The bed boundary indicator calculations for a bin may be based on the longest transmitter-receiver spacing measurements, e.g., receiver 104's (R3) response to transmitter 118 (T4) and/or 120 (T6). For example, if, given the measurements in a bin, the average measured signal phase of receiver 104 relative to the excitation signal of transmitter 120 is $\Phi_{R3T6}$, the bed boundary indicator may be calculated as:

$$I = (\Phi_{R3T6} \text{ in the current bin}) - (\Phi_{R3T6} \text{ in the bin } 180° \text{ from current bin}) \quad (7)$$

Thus, with reference to FIG. 6, the bed boundary indicator for bin 602 may calculated from the difference in average measured signal phase between bins 602 and 610. The bed boundary indicator for bin 604 may be calculated using a difference between phase measurements for bins 604 and 612. Alternatively, a difference in logarithms of amplitude (attenuation) of receiver 104's response relative to the transmitter 120 signal between these bins may be used instead of phase differences:

$$I = \ln(A_{R3T6} \text{ in the current bin}) - \ln(A_{R3T6} \text{ in the bin } 180° \text{ from current bin}) \quad (8)$$

As yet another alternative, rather than taking a difference between phase or log amplitude of bins 180° apart, the difference may be determined between the phase (or log amplitude) for the current bin and the average phase (or log amplitude) for all the bins at a given axial position in the borehole:

$$I = (\Phi_{R3T6} \text{ in bin}(k, z)) - \frac{1}{n} \sum_{i=1-n} (\Phi_{R3T6} \text{ in bin}(i, z)) \quad (9)$$

$$I = \ln(A_{R3T6} \text{ in bin}(k, z)) - \frac{1}{n} \sum_{i=1-n} \ln(A_{R3T6} \text{ in bin}(i, z)) \quad (10)$$

where bin(k,z) is the bin at the kth rotational position at the zth longitudinal position in the borehole. It is likely that measurements can be repeated many times for each bin and the phase/amplitude values used are actually averages of these repeated measurements.

Returning to FIG. 4, the resistivity measurement and bed boundary indicator are communicated to a user in block 414. The measurement and indicator may be displayed as a function of tool position and azimuthal orientation, preferably while logging (and drilling) operations are ongoing, enabling the user to steer the drilling assembly with the benefit of this information. The display may be updated as each measurement is made, or alternatively, may be updated in stages, i.e., after a sufficient number of measurements have been acquired for a given tool position. In block 416, a check is made to determine if there are more transmitters to be selected in the current firing cycle, and if so, the next transmitter in the firing order is selected in block 418. If not, a check is made in block 420 to determine whether the logging operations are complete, and if not, the next firing cycle is started in block 402. Otherwise the method terminates.

Figure 5:
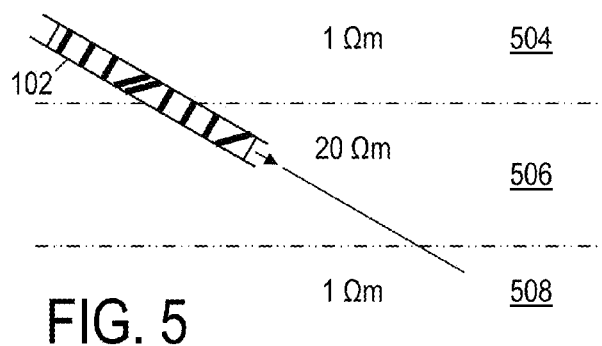
FIG. 5 shows a simulated logging environment having multiple beds with differing resistivities.
Figure 8:
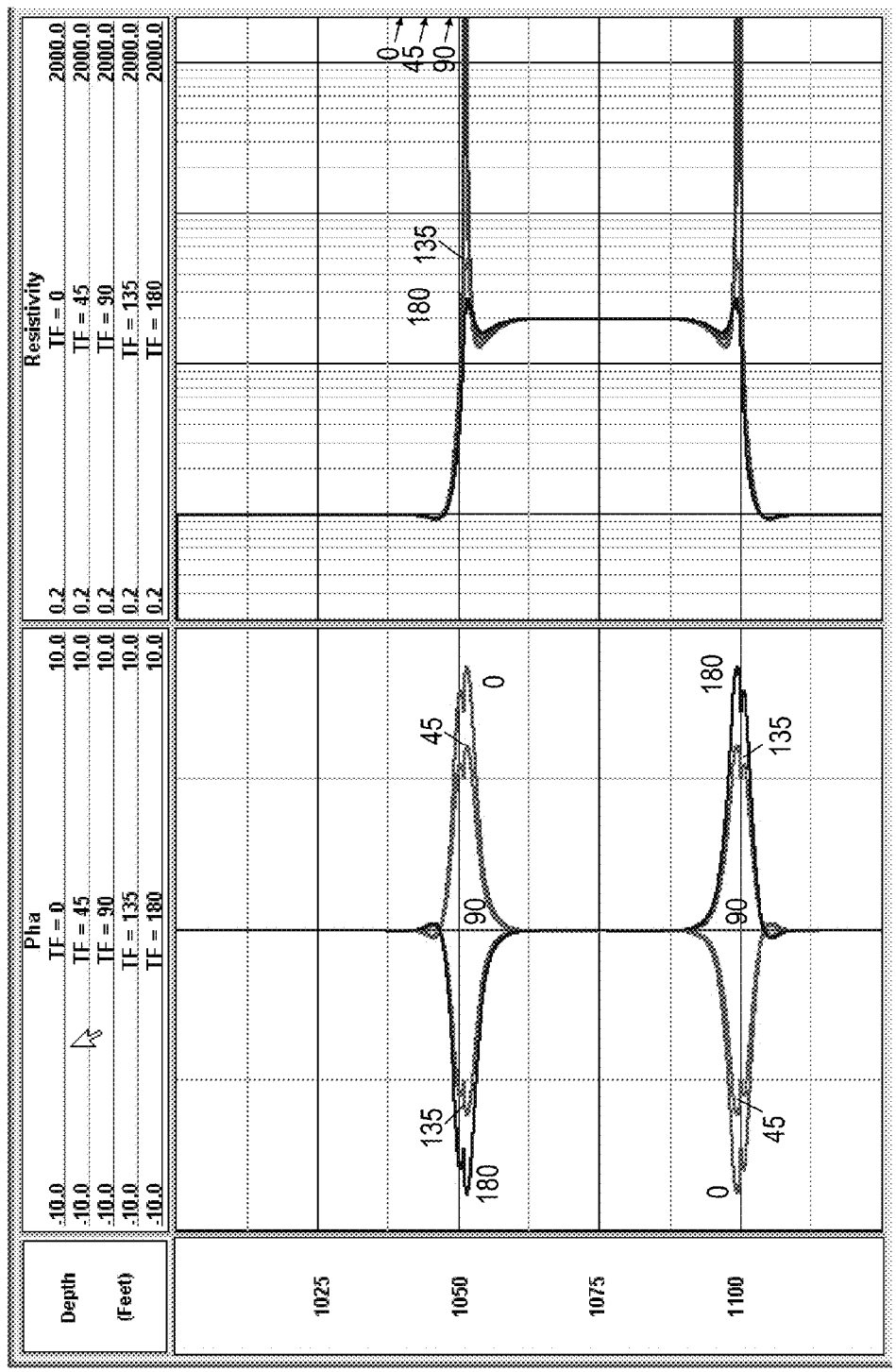
FIG. 8 shows azimuthally-sensitive logs for the simulated environment in FIG. 5.

FIG. 5 shows an illustrative logging environment used to simulate the operation of logging tool 102. Logging tool 102 is penetrating a formation having three beds 504-508 at a relative dip angle of 60°. Beds 504 and 508 have a resistivity of 1 Ωm, and sandwiched between them is a 50 foot-thick bed 506 having a resistivity of 20 Ωm. In the first simulation, the resistivity of these beds is assumed to be isotropic. FIG. 8 shows the logs of the bed boundary indicator (on the left) and the azimuthal resistivity (on the right). The azimuthal orientation of the tool is measured from the top of the borehole. (The tool is illustrated with an azimuthal orientation of 0°.)

Figure 9:
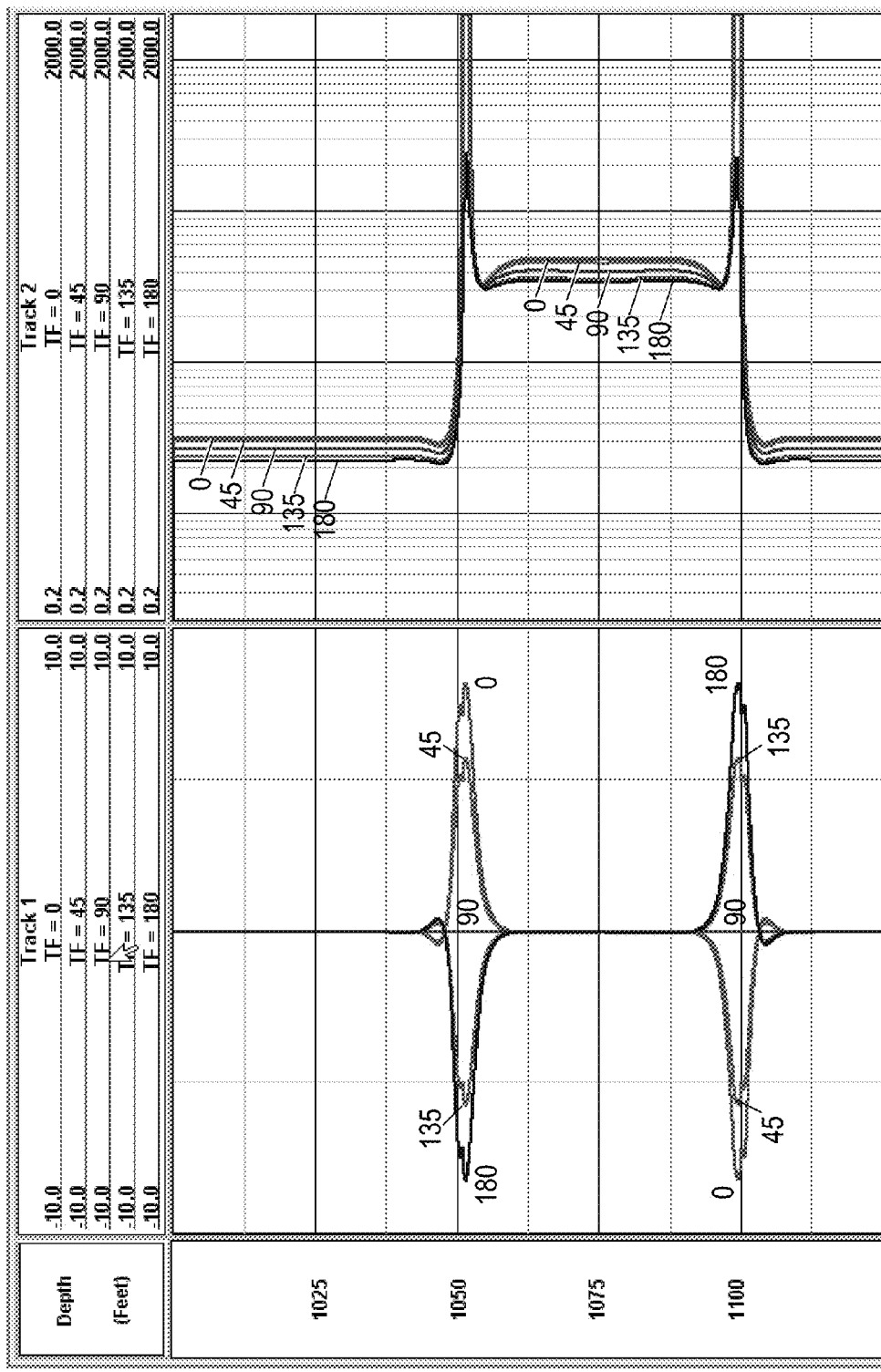
FIG. 9 shows azimuthally-sensitive logs for an anisotropic formation that is otherwise similar to the simulated environment in FIG. 5.

At an azimuth of 0, the bed boundary indicator starts off at zero, and as the tool approaches the boundary between beds 504 and 506, the indicator increases, indicating that the receiver antenna is tilted toward an approaching boundary with a bed having a higher resistivity than the current bed. As the boundary passes, the indicator drops back to zero, until the tool approaches the boundary between beds 506 and 508. There the indicator drops, indicating that the receiver antenna is tilted towards an approaching boundary having a lower resistivity than the current bed. As the boundary passes, the indicator drops back to zero. A similar, though weaker, response is visible at the 45° azimuth. At 90° azimuth, the indicator is uniformly zero, indicating that no boundary is being approached in that direction. At 135° and 180°, the indicator mirrors the response at 45° and 0°, respectively. A driller seeking to enter and remain in a high-resistivity bed would steer away from the directions in which the tilted antenna produces a negative bed boundary indicator value, and towards those directions that produce a positive indicator value. Of course, allowances should be made for limited turning radius and the desire for shallow approach angles. As can be seen in FIG. 9, anisotropy does not significantly affect the behavior of the bed boundary indicators.

In FIG. 8, the azimuthal resistivity measurements are closely aligned in the isotropic formations, departing from one another only at the bed boundaries. However, in anisotropic formations, the azimuthal resistivity measurements diverge as seen in FIG. 9 because the apparent resistivity depends on the alignment between the tilted receiver and the axis of anisotropy. An inversion technique may be used to exploit this divergence to determine vertical resistivity, horizontal resistivity, and formation dip. Thus the disclosed tool can be used both as a resistivity tool and as a tool for geosteering.

Though FIGS. 8 and 9 have been shown using multiple curves, the data can also be presented in the form of an image. The image may display pixels at different positions along a depth axis and along an azimuthal axis, with color or intensity representing the magnitude of the resistivity or boundary detection measurements. A standard two-dimensional "borehole wall image" style may be adopted, in which the image represents an "unrolled" borehole wall surface. Alternatively, a three-dimensional "virtual reality" style may be preferred, in which the borehole is displayed as a three-dimensional object as seen from a user-adjustable viewpoint.

Though the focus of the examples above has been mainly on the use of phase difference measurements, attenuation measurements can be alternatively or additionally used to determine resistivity and bed boundary indications. While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A logging method that comprises:
   logging a borehole with an azimuthally-sensitive resistivity logging tool;
   deriving a boundary detection signal from an azimuthal dependence of measurements provided by said tool;
   deriving a resistivity log from measurements provided by said tool; and
   displaying at least one of the boundary detection signal and the resistivity log.

2. The logging method of claim 1, wherein the resistivity log is derived from measurements made by a symmetric transmitter-receiver arrangement in said tool.

3. The logging method of claim 2, wherein the boundary detection signal is derived from measurements made by an asymmetric transmitter-receiver arrangement in said tool.

4. The logging method of claim 2, wherein the symmetric transmitter-receiver arrangement comprises a pair of tilted receivers equally spaced from a midpoint between two coaxial antennas.

5. A logging system that comprises:
   a logging tool that obtains resistivity measurements as a function of tool position and orientation; and
   a processor that processes an azimuthal dependence of at least some of said measurements to determine a bed boundary indicator signal.

6. The logging system of claim 5, wherein a subset of said measurements are made by symmetric transmitter-receiver arrangement in said tool, and wherein the processor generates a resistivity log based at least in part on this subset.

7. The logging system of claim 6, wherein a second subset of said measurements are made by an asymmetric transmitter-receiver arrangement in said tool, and wherein the processor derives the bed boundary indicator signal based at least in part on this second subset.

8. The logging system of claim 6, wherein the symmetric transmitter-receiver arrangement comprises a pair of tilted receivers equally spaced from a midpoint between two coaxial transmit antennas.

* * * * *